J. O. Kopas,
Cage Trap.
No. 102,134. Patented Apr. 19, 1870.
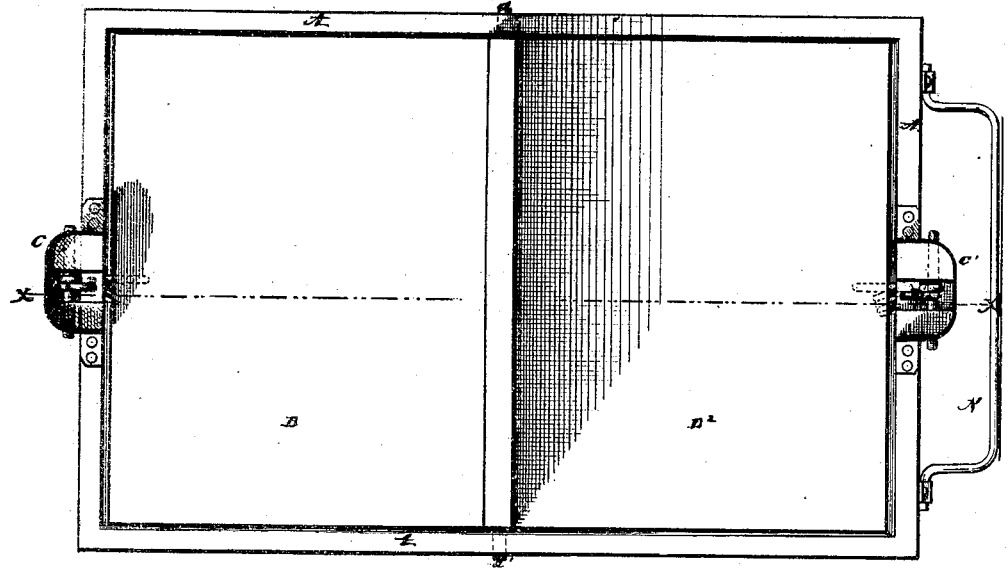
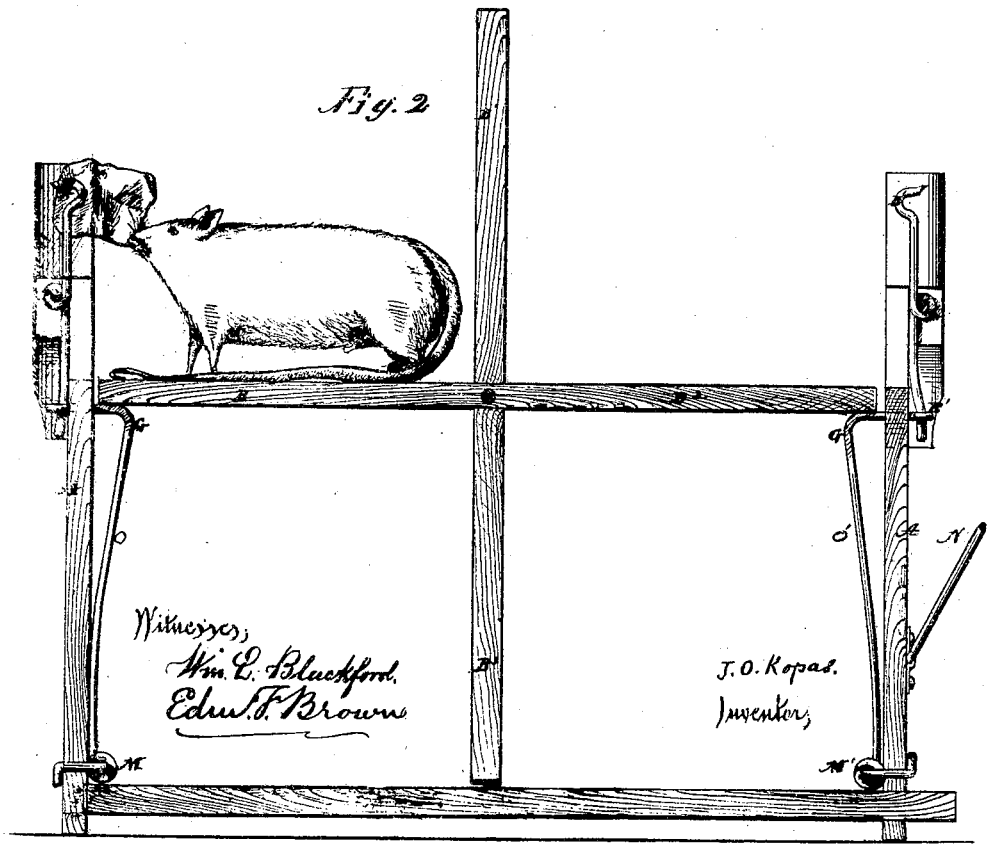

United States Patent Office.

JOHN O. KOPAS, OF WASHINGTON, DISTRICT OF COLUMBIA, ASSIGNOR FOR ONE-HALF HIS RIGHT TO SYDNEY IRVING WAILES, OF SALISBURY, MARYLAND.

Letters Patent No. 102,134, dated April 19, 1870.

---

IMPROVED ANIMAL-TRAP.

The Schedule referred to in these Letters Patent and making part of the same.

---

I, JOHN O. KOPAS, of the city of Washington, District of Columbia, have invented an Improvement in Animal-Traps, of which the following is a specification.

The nature of my invention consists of a box-platform animal-trap, operated by the weight of the animal, a description of which is as follows, reference being had to the accompanying drawings forming a part of this specification, of which—

Figure 1 is a plan or top view of trap.

Figure 2 is a section on line x x.

A is a box, which may be constructed in the usual form, of either wood or metal.

A series of rotary platforms at right angles to each other is supported at the points $a'$ $a$ by the axle, which may run partly or entirely through the box, forming the axis of the rotary structure.

On the sides of the box A, and at right angles to the sides on which the platforms are suspended, are placed guards C C', within which the bait to entice the animal is secured by means of the wires D D' of the ordinary hook form. Said wires, in passing down to the loops E E', are coiled about the axes F F'.

The wires O O', to which the loops E E' are attached, pass through the sides of the box, and form knees G G', on which rest, at one time, two of the platforms of the rotary structure. Passing vertically from the knees, these wires form, at or near the bottom of the box, coiled springs M M', to give return movement to the knees G G'.

At the bottom of the box is a drawer, H, sliding in grooves in the sides of the box, to empty the trap of its contents.

The handle N at the side of the box serves as a convenience in carrying.

The box A may be of any required depth.

The platforms B B', being at rest on the knees G G', and the bait secured to the bent wires D D', with the drawer in its place, the trap is ready to receive an applicant. As he advances upon the platform B he readily seizes the bait, which, being drawn toward him, communicates its movement to the wire to which the loop E is attached, withdrawing the knee G from under the platform B, and allowing it, with the weight of the animal, to fall to the drawer below, which, being drawn out, allows him to fall to a less comfortable place. As the animal falls with the platform B, the next platform $B^3$ passes to the wire O', which yielding, allows it, with the impetus given by the fall of the animal, to pass over the knee G', where it is required to rest. The knees G G', having already returned, prevent the platform $B^1$ from passing, and the trap is again ready. The trap may be operated from either side, making it double.

What I claim as new, and wish to secure by Letters Patent, is—

The box or case A, provided with guards C C', bait-hooks D D', loops E E', wires O O', forming-knees G G', and springs M M', rotary platforms B $B^1$ $B^2$ $B^3$, and sliding drawer H, when all the parts are constructed and arranged to operate as herein described for the purpose specified.

J. O. KOPAS.

Witnesses:
EDM. F. BROWN,
WM. L. BLACKFORD.